United States Patent [19]

Gianzero et al.

[11] Patent Number: 4,980,643

[45] Date of Patent: Dec. 25, 1990

[54] INDUCTION LOGGING AND APPARATUS UTILIZING SKEW SIGNAL MEASUREMENTS IN DIPPING BEDS

[75] Inventors: Stanley Gianzero; Shey-Min Su, both of Austin, Tex.

[73] Assignee: Halliburton Logging Services, Inc., Duncan, Okla.

[21] Appl. No.: 413,578

[22] Filed: Sep. 28, 1989

[51] Int. Cl.$^5$ .......................... G01V 3/28; G01V 3/38
[52] U.S. Cl. ..................................... 234/339; 324/343
[58] Field of Search ..................... 324/339, 340, 343

[56] References Cited

U.S. PATENT DOCUMENTS

| | | | |
|---|---|---|---|
| 3,187,252 | 6/1965 | Hungerford | 324/343 |
| 3,510,757 | 5/1970 | Huston | 324/343 |
| 3,609,521 | 9/1971 | Desbrandes | 324/343 |
| 3,808,520 | 4/1974 | Runge | 324/343 |

OTHER PUBLICATIONS

Gianzero, S., Lin Y—Y, "Inversion of Induction Logging Data Using the Least Squares Techniques", Paper AA, SPWLA 25th Annual Logging Symposium, Jun. 10-13, 1984.
Gianzero, S., Lin Y., Su, S., "A New High-Speed Hybrid Technique for Simulation and Inversion of Resistivity Logs", SPE 14189, Sep. 22-25, 1985.
Minerbo, G., "Inversion of Induction Logs in dipping Beds", Progress in Electromagnetics Research Symposium, Session XIX, Jul. 25-26, 1989.
Moran, J. H., Gianzero, S., Effects of Formation Anisotropy on Resistivity-Logging Measurements, Geophysics, vol. 44, No. 7, Jul. 1979, pp. 1266-1286.
Gianzero, Stanley C. "Effect of Sonde Eccentricity . . . Induction-Logging Tools, " IEEE Trans. on Geoscience Electronics, vol. GE-16, No. 4, Oct. 1978, pp. 332-339.

Primary Examiner—Gerald R. Strecker
Attorney, Agent, or Firm—William J. Beard

[57] ABSTRACT

A second receiver coil system (45a,45b) at right angles to the primary receiver coil system (40) in an induction logging tool (10) detects the skewness in the logging tool field pattern caused by the presence of assymmetrical formation structures (30). This skew signal, which provides a composite measure of the asymmetry of the formation structures (30), can be used to correct for horns produced in formation conductivity logs when the logging tool sonde (14) traverses interfaces between dipping beds. The skew signal can also be used to determine the dip and strike angles between such dipping beds.

26 Claims, 13 Drawing Sheets

INDUCTION LOGGING AND APPARATUS UTILIZING SKEW SIGNAL MEASUREMENTS IN DIPPING BEDS

BACKGROUND OF THE INVENTION

The present invention relates to well logging tools, and more particularly to induction logging methods and apparatus for measuring the resistivity (or its inverse, conductivity) of earth formations penetrated by a borehole.

The basic principles and techniques for induction logging of earth formations are well known. In brief, the resistivities of the various formation structures are determined by inducing eddy currents to flow in the formations in response to an AC transmitter signal, and then measuring a phase component in a receiver signal generated by the eddy currents. Usually the component of the receiver signal which is in phase with the transmitter signal is taken as indicative of the formation conductivity. With proper coil design, the output signal can be directly and linearly proportional to the electrical conductivities of the formations over most formation conductivity values commonly encountered. The output signal is then multiplied by an appropriate tool constant for recording at the surface as a function of the depth of the tool in the borehole.

An induction logging problem which has received considerable attention has to do with the undesirable appearance of "horns" on many logs at bed boundaries. These horns, which generally appear as narrow spikelike features on the log, are artifacts of the logging tool (particularly noticeable with highly focused tools), not of the formation. The magnitude of the horn effect varies with the dip angle of the formations, increasing non-linearly with increasing dip angles. Compensating for such horns can be very difficult, especially since information about formation dip relative to the borehole is often not known. Even when specific dip information is available, it would certainly be better to have a tool which was not adversely affected in the first place by dipping bed boundaries.

In fact, any asymmetry in the formation structure can cause horns or a horn-like distortion in the log (as can a wash-out, or cave effect, as well). When the asymmetry is more broadly distributed than the sharp transition found at a dipping bed boundary, the distortion in the log may even go unnoticed. This can occur, for example, with the so-called "shoulder effect", which is effectively averaged over a large enough distance that no "horn" as such is seen, but a distortion is still present. Therefore, not only is it desirable to have an induction logging tool which is unaffected by formation asymmetries, but it is also desirable to have an induction logging tool which can further provide an indication or measure of the actual asymmetry of the formation structure itself.

The reason that such asymmetries adversely affect induction logging tools has to do with the way an asymmetrical formation structure distorts or "skews" the transmitter field structure. The resultant "skew" signal then appears on one or more axes orthogonal to the transmitter. In order to describe the skew signal, it is helpful first to review the standard configuration for induction logging wherein the skew signal is absent. Ideal conditions are defined as a sonde centered in the borehole with the borehole axis coincident with the tool mandrel. Moreover, all of the bedding planes are horizontal (i.e., zero dip or deviation angle) and, consequently, orthogonal to the borehole wall and invaded zones. In this instance, all of the eddy currents induced by the sonde are tangential to the boundaries separating media of different conductive properties. The current (field) pattern is axisymmetric and the skew signal is absent. In the parlance of wave guides, the electromagnetic fields are described as "transverse electric" (TE) type fields. That is, the electric fields are transverse to the borehole axis, thereby precluding any longitudinal component of the electric field parallel to the direction of the borehole axis.

On the other hand, whenever the symmetry of the field pattern is disturbed due to tilt, eccentering, dipping beds, etc., the eddy currents intersect the boundaries and the fields develop a "transverse magnetic" (TM) field component. As described more fully herein, this gives rise to the skew signal.

A need therefore remains for induction logging methods and apparatus which automatically compensate for the presence of asymmetrical formation structures and generate a log of formation conductivity or resistivity which is essentially free of horns at bed boundaries, and free of analogous distortions in other asymmetrical formation structures. A need also remains for such induction logging methods and apparatus which can advantageously furnish an indication or measure of the actual asymmetry of the formation structures being logged. Desirably, such methods and apparatus will also be able to provide information such as the dip and strike of dipping formation beds.

SUMMARY OF THE INVENTION

Briefly, the present invention meets the above needs and purposes with an improved apparatus for induction logging which takes advantage of a signal which has always been present during induction logging of asymmetrical formations, but which it is believed has previously gone unrecognized.

Conventional induction logging tools orient the receiver coil structure co-axially with the transmitter coil system, and to a first order approximation do not notice or respond to the spurious skew signals produced by asymmetrical formations. In accordance with the present invention, however, it has been found that one or more additional receiver coils with arbitrary orientations with respect to the borehole axis can directly measure the skew signal, and that the skew signal provides a direct composite measure of the asymmetry of the formation structure. (In the preferred embodiment, the additional receiver coils are oriented orthogonally to the transmitter coil system.) Additionally, the skew signal can be used to provide information about dipping formations, such as the dip and strike of the formation. The skew signal can also be easily and directly used to correct for horns in the logs without reducing the tool's vertical resolution. The correction for removing such horns (and otherwise compensating for log errors due to skewness in the field pattern) surprisingly turns out to involve but a straightforward gating on and off, with appropriate linear interpolation, of a clipping function applied to the conventional log. The gating is controlled by the skew signal, preferably after application of an appropriate band pass filter to the skew signal.

It is therefore a feature of the present invention to provide improved induction logging methods and apparatus for measuring the resistivity of earth formations penetrated by a borehole; such methods and apparatus which automatically compensate for the presence of asymmetrical formation structures and generate a log of formation conductivity or resistivity which is essentially free of horns at bed boundaries; which also generate logs free of analogous distortions in other asymmetrical formation structures; which can advantageously furnish an indication or measure of the actual asymmetry of the formation structures being logged; which can provide information such as the strike of dipping formation beds; which include transmitter coil means and first receiver coil means adapted for movement through a borehole, means for energizing the transmitter coil means to induce in the receiver coil means a signal characteristic of the conductivity of formations adjacent the borehole, second receiver coil means having an orientation different from the first receiver coil means, and means connected to the coil means for determining a skew signal induced in the second receiver coil means by skewness in the field pattern when in the presence of an asymmetrical formation structure; in which the first and second receiver coil means may be substantially orthogonal to one another; in which the first receiver coil may be oriented substantially vertically and the second substantially horizontally; which may include means coupled to the receiver coil means for generating a log of the conductivity of the formations; which may also include means for using the skew signal to correct for horns produced in such a log when the induction logging apparatus traverses an interface between dipping beds; in which the means for correcting for horns in the log may be a means for clipping the receiver coil signals to correct for such horns; in which the signals may be clipped in response to the skew signal; which may include means for using the skew signal to determine the dip of dipping beds; which may include means for using the skew signal to determine the strike of dipping beds; which may include means for using the skew signal to generate a composite measure of the asymmetry of the formation structure; in which the coil means may be symmetrical; in which the transmitter coils may be symmetrically located on each side of the receiver coil means; and to accomplish the above feature and purpose in an inexpensive, uncomplicated, durable, versatile, and reliable method and apparatus, inexpensive to manufacture, and readily suited to the widest possible utilization in induction logging of earth formations.

These and other features and advantages of the invention will be apparent from the following description, the accompanying drawings, and the appended claims.

DESCRIPTION OF THE PREFERRED EMBODIMENT

Figure 1:
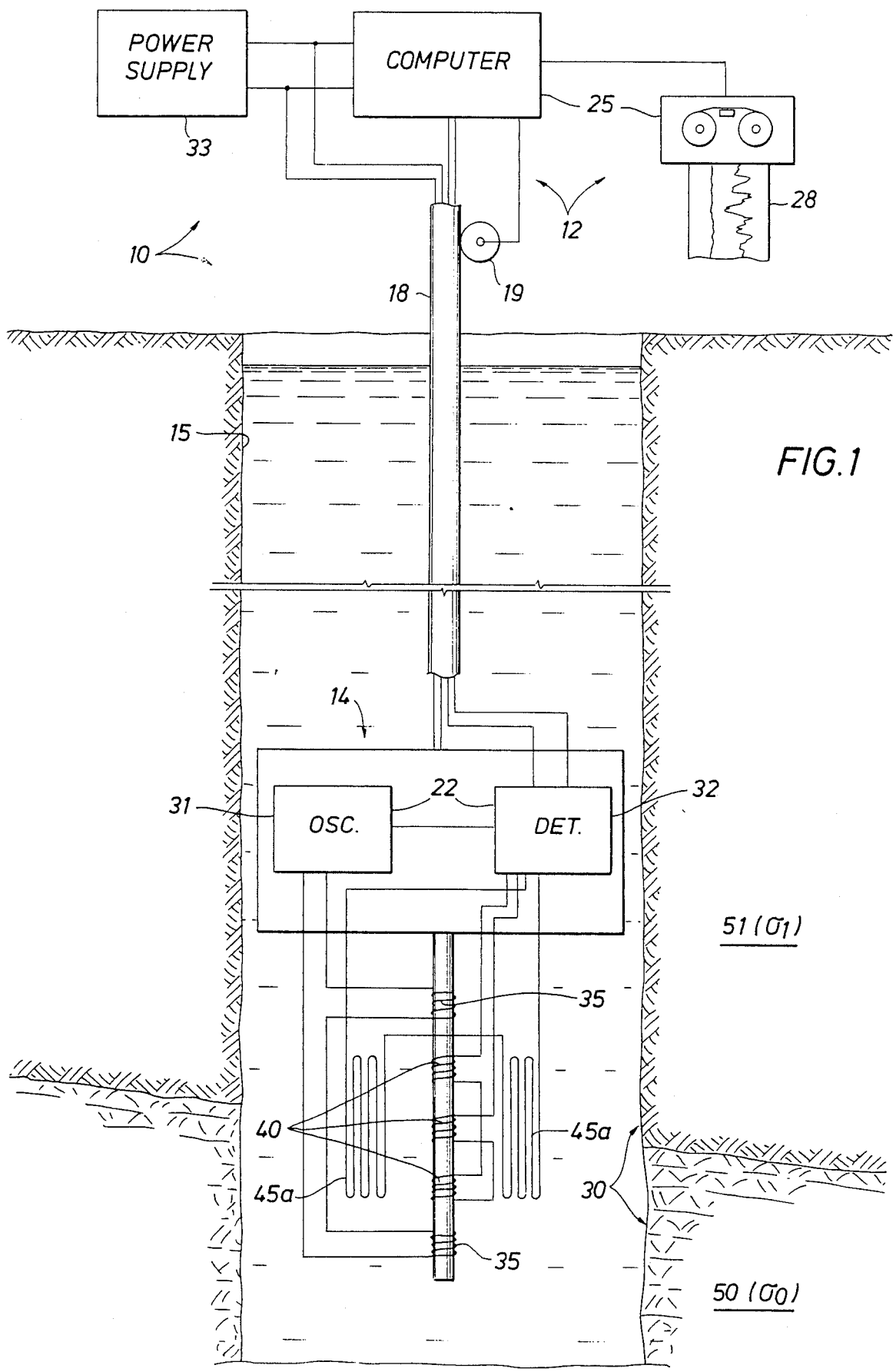
FIG. 1 is a somewhat figurative block diagram showing an induction logging apparatus according to the present invention positioned in a wellbore, the coils for one of the horizontal axes being omitted for clarity of illustration.

With reference to the drawings, the new and improved apparatus for induction logging, and the method therefor according to the present invention, will be described. FIG. 1 is a somewhat figurative block diagram showing a preferred embodiment of an induction logging apparatus 10 according to the present invention (one of the horizontal axis coils being omitted for clarity of illustration). Mechanically, the preferred embodiment 10 is substantially the same as that shown in copending U.S. patent application Ser. No. 40,879, filed Apr. 21, 1987, now abandoned in favor of continuation application Ser. No. 474,230 filed Feb. 2, 1990, and assigned to the assignee of the present invention. The '879 disclosure is accordingly incorporated herein by reference, and, except for the improvements taught by the present invention, only an abbreviated description of the overall structure and operation of tool 10 will be given.

Figure 2:
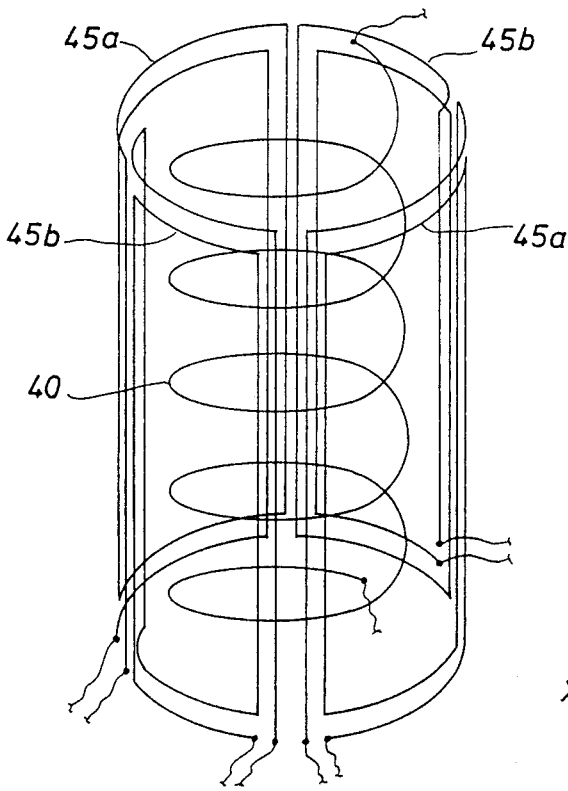
FIG. 2 is an enlarged schematic detail illustrating figuratively the relative positions of the vertical and horizontal receiver coils.

As shown in FIG. 1, tool 10 includes surface equipment 12 and a downhole sonde portion 14. Sonde 14 is supported in a borehole 15 by a conventional logging cable 18, both of which are raised and lowered within borehole 15 in known fashion by a winch 19 located in the surface equipment 12. Cable 18 connects downhole electronics 22 with a computer and recording system 25, in equipment 12, for generating a log 28 of the resistivities of the various earth formations 30 through which borehole 15 passes. Circuits 22 and 25 include oscillator 31, detector 32, power supply 33, and other circuits, as more specifically described in the above-noted '879 application or otherwise well known in the art. These circuits induce AC currents into the transmitter coils 35 and then detect and measure the phase component(s) of interest which are consequently induced into the vertical receiver coils 40 and horizontal receiver coils 45a and 45b (FIG. 2) by the resulting eddy currents flowing in the formations 30 which surround the borehole. The signals induced in the horizontal receiver coils 45a and 45b are detected by circuit 32 in the same manner as those in the vertical receiver coils 40. The processing of these various signals is then carried out in computer 25 as further described below.

More particularly, it has been found that the horizontally oriented receiver coils 45a and 45b detect skew signals which are a direct function of the degree of asymmetry in the formation structures in the vicinity of the logging sonde 14. (As discussed earlier, in an infinite, symmetrical formation bed, no formation signal will be coupled into horizontal receiver coils from a vertical transmitter coil.) These skew signals, detected in the same manner as, and in phase with, the primary conductivity signals detected in vertical coils 40, are then appropriately combined with the primary conductivity signal to correct for horns or related log distortions caused by any asymmetry which may be present in the formation structure. Implementation of this correction may easily be carried out in the surface computer 25.

The following development provides a theoretical basis and proof for the case of a single dipping interface separating two infinitely thick beds. Having established a theoretical basis for this special case, it has further been found (without proof here) that these results are also applicable to other asymmetrical formation structures.

The following mathematical proof is rather complicated. For those who do not wish to follow the development in detail, equations (3-28) and (3-29) describe the magnetic fields induced in the pair of coils 45a and 45b by magnetic coupling due to the dip of the adjacent formation. Equation (3-30) shows how to determine the strike angle of the formation from the induced fields as described by equations (3-28) and (3-29). Correction for horns in the log is accomplished by using the skew signal to indicate where the horns are. Preferably the horn loci are accentuated by applying a band pass filter over the skew signal, giving very sharp spikes on the skew log. Then, because the width of the horns on the conventional log is just the bucking inter-receiver spacing, the conventional log is clipped over this width (under the control of this skew signal) with an appropriate linear interpolation applied to the conventional signal.

By way of introduction, it is noted that the induced magnetic field in a receiver coil from a transmitter coil in a dipping formation is related to the coupling coefficients which, in turn, are dependent upon strike, dip, formation conductivities, and the logging tool position. A procedure will now be described for the determination of these coefficients for a single dipping bed boundary between infinitely thick beds in the absence of skin effect. In the procedure, the coupling coefficients will be extracted by means of a series expansion valid for low frequencies. Examination of this simple case will then show that the overall response with skin effect produces essentially the same results as the simple case with no skin effect. That is, once the approximate coupling coefficients have been determined, it will be shown that the dominant physical behavior of the response of an induction logging tool to a dipping bed is adequately described without skin effect. Skin effect is then a small parasitic effect superimposed upon the previous behavior. The coupling coefficients then make it possible to find not only the standard induction signal, but also the magnetic coupling into orthogonal receiver coils, referred to previously as the "skew" coupling, which is valuable because it can be used to correct the horns on the standard log without any loss in resolution.

Figure 3:
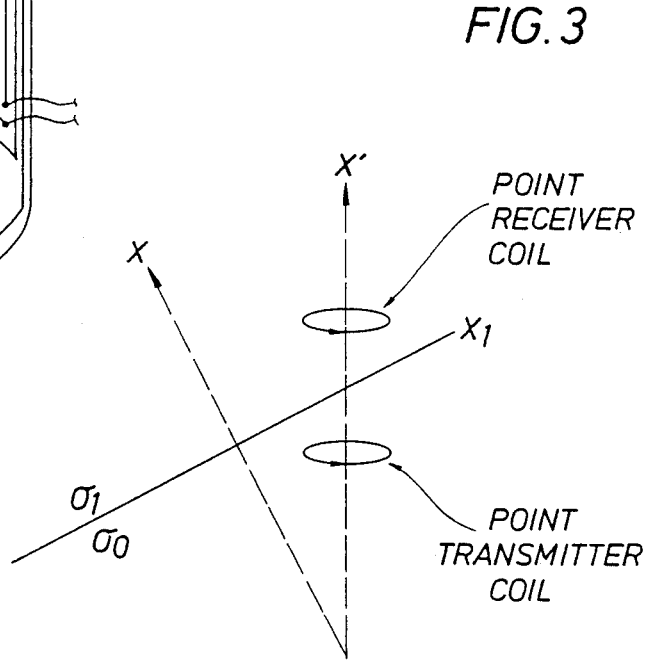
FIG. 3 depicts geometrically the coil system adjacent a single dipping bed boundary.

FIG. 3 depicts the degenerate case of a single dipping bed boundary between formations 50 and 51 having respective conductivities $\sigma_0$ and $\sigma_1$. There are essentially two coordinate systems which are involved: the system of sonde 14 (primed), and the system of the formations 50 and 51 (unprimed). These are connected by a rotation described by a matrix. Consequently, the magnetic moment of the transmitter coils 35 in the sonde system is transformed (rotated) into "effective" moments in the bedding system. These effective moments couple to the magnetic field by means of a coupling matrix. Finally, the magnetic field components in the sonde system are found by applying the inverse rotation matrix to those components in the bedding system.

Stated mathematically, the magnetic moments M' in the transmitter coil in the sonde system 14 are rotated by a rotation matrix R into the moments M in the bedding system:

$$M = RM' \qquad (2\text{-}1)$$

Figure 4:
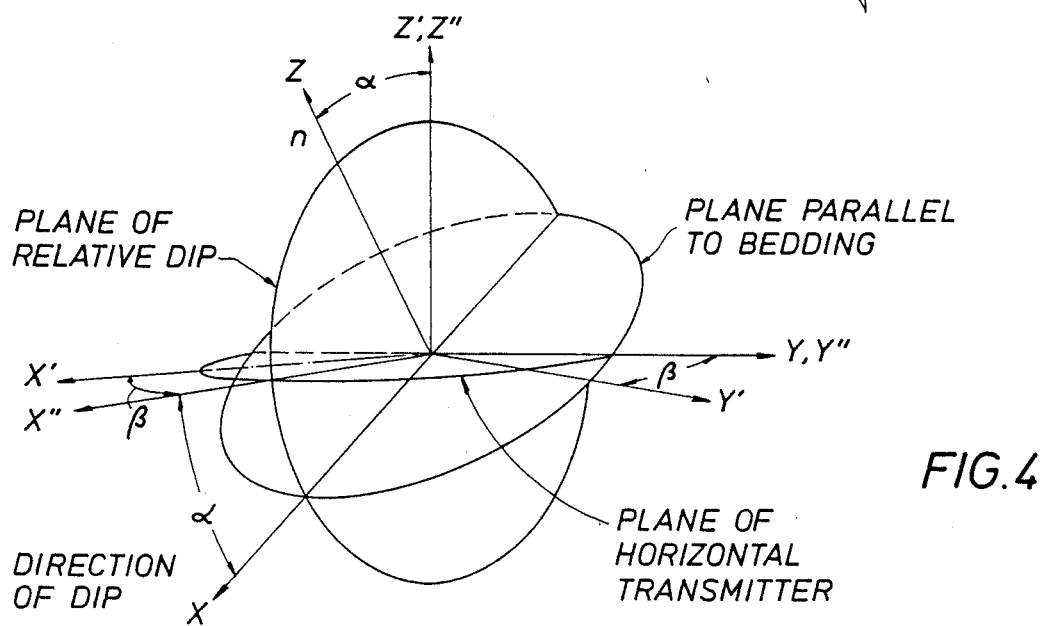
FIG. 4 is a geometric representation of the orientation of the coil system relative to the formation system which contains the dipping bed boundary depicted in FIG. 3.

More explicitly, $$\begin{pmatrix} M_x \\ M_y \\ M_z \end{pmatrix} = \begin{pmatrix} \cos\alpha\cos\beta & \cos\alpha\sin\beta & -\sin\alpha \\ -\sin\beta & \cos\beta & 0 \\ \sin\alpha\cos\beta & \sin\alpha\sin\beta & \cos\alpha \end{pmatrix} \begin{pmatrix} M_x' \\ M_y' \\ M_z' \end{pmatrix} \qquad (2\text{-}2)$$

where $\alpha$ and $\beta$ denote the dip and strike angles respectively. The orientation of the coil system relative to the formation system is indicated in FIG. 4.

The coupling of the magnetic moments in the sonde system to the magnetic fields is described by a coupling matrix, viz:

$$H = C^h M \qquad (2\text{-}3)$$

or equivalently, $$\begin{pmatrix} H_x \\ H_y \\ H_z \end{pmatrix} = \begin{pmatrix} C^h_{xx} & 0 & C^h_{zz} \\ 0 & C^h_{yy} & 0 \\ C^h_{xx} & 0 & C^h_{zz} \end{pmatrix} \begin{pmatrix} M_x \\ M_y \\ M_z \end{pmatrix} \qquad (2\text{-}4)$$

where the superscript h indicates magnetic coupling.

Finally, once the magnetic field components have been found in the bedding system, the corresponding components in the sonde system are found with the inverse rotation matrix $R^{-1}$, by means of the following:

$$H' = R^{-1} H \qquad (2\text{-}5)$$

or, $$\begin{pmatrix} H_x' \\ H_y' \\ H_z' \end{pmatrix} = \begin{pmatrix} \cos\alpha\cos\beta & -\sin\beta & \sin\alpha\cos\beta \\ \cos\alpha\sin\beta & \cos\alpha & \sin\alpha\sin\beta \\ -\sin\alpha & 0 & \cos\alpha \end{pmatrix} \begin{pmatrix} H_x \\ H_y \\ H_z \end{pmatrix} \qquad (2\text{-}6)$$

All of the previous operations can be written in terms of a single operation in the sonde system, $$H' = C^{h'} M' \qquad (2\text{-}7)$$

where the coupling matrix in the sonde system is related to that in the bedding system through a similarity transformation (see H. Goldstein, *Classical Mechanics*, Addison Wesley Publishing Co., Inc., Reading, Mass., 1950, p. 105, eq. (4-41)):

$$C^{h'} = R^{-1} C^h R \quad (2\text{-}8)$$

For the specific case of a point transmitter coil of magnetic moments $M_x' = 0 = M_y'$ and $M_z' = M$, equation (2-2) tells us that the effective moments in the bedding system are $$M_x = -M\sin\alpha \quad (2\text{-}9)$$
$$M_y = 0$$
$$M_z = M\cos\alpha$$

The above set of equations combined with equations (2-4) and (2-6) determine the governing field component in the receiver coil in the sonde system:

$$H_z' = \frac{M}{2}[(C_{zz}^h + C_{xx}^h) + \quad (2\text{-}10)$$
$$(C_{zz}^h - C_{xx}^h)\cos 2\alpha - (C_{xz}^h + C_{zx}^h)\sin 2\alpha]$$

The discussion will be confined to the coupling coefficients in the medium of the transmitter (i.e., medium '0').

The cylindrical coordinates of the receiver coil, after translating to a coordinate system centered on the transmitter coil, are given by the following equations:

$$\rho = L\sin\alpha, \phi = \pi, z = L\cos\alpha \quad (2\text{-}11)$$

with L being the tool spacing.

Apart from evaluating the coupling coefficient at the azimuth coordinate of the receiver coil $\phi = \pi$, the radial and depth coordinates will remain unspecified for the sake of brevity. The expressions for the exact coupling coefficients are:

$$C_{zz}^h = \frac{1}{4\pi} \int_0^\infty \frac{dk k^3 J_0(k\rho)}{\beta_0}\left[e^{-\beta_0(z-z_0)} + \quad (2\text{-}12)\right.$$
$$\left.\left(\frac{\beta_0 - \beta_1}{\beta_0 + \beta_1}\right)e^{-\beta_0(z+z_0-2z_1)}\right]$$

$$C_{zx}^h = -\frac{1}{4\pi} \int_0^\infty dk k^2 J_1(k\rho)\left[e^{-\beta_0(z-z_0)} + \quad (2\text{-}13)\right.$$
$$\left.\left(\frac{\beta_0 - \beta_1}{\beta_0 + \beta_1}\right)e^{\beta_0(z+z_0-2z_1)}\right]$$

$$C_{xz}^h = -\frac{1}{4\pi} \int_0^\infty dk k^2 J_1(k\rho)\left[e^{-\beta_0(z-z_0)} + \quad (2\text{-}14)\right.$$
$$\left.\left(\frac{\beta_0 - \beta_1}{\beta_0 + \beta_1}\right)e^{\beta_0(z+z_0-2z_1)}\right]$$

$$C_{xx}^h = \frac{k_0^2}{4\pi\rho} \int_0^\infty \frac{dk J_1(k\rho)}{\beta_0}\left[e^{-\beta_0(z-z_0)} + \quad (2\text{-}15)\right.$$
$$\left.\left(\frac{\sigma_0\beta_1 - \sigma_1\beta_0}{\sigma_0\beta_1 + \sigma_1\beta_0}\right)e^{\beta_0(z+z_0-2z_1)}\right] -$$

$$-\frac{1}{4\pi} \int_0^\infty dk k \beta_0 J_1'(k\rho)\left[e^{-\beta_0(z-z_0)} + \right.$$
$$\left.\left(\frac{\beta_0 - \beta_1}{\beta_0 + \beta_1}\right)e^{\beta_0(z+z_0-2z_1)}\right]$$

where $\beta_{0,1} = \sqrt{k^2 - k_{0,1}^2}$ in the above, and a $(-i\omega\mu_0)$ factor has been multiplied throughout to convert the magnetic current density to a magnetic dipole moment according to the conventional procedure. (Note that in equations (2-12) through (2-15) it has been implicitly assumed that the receiver $z = z$ is above the transmitter $z = z_0$.)

The procedure for the approximate solution is straight-forward, namely: expand the axial propagation constants $\beta_0$ and $\beta_1$ in a power series in frequency. Specifically, we take $$\beta_{0,1} = k\sqrt{1 - \left(\frac{k_{0,1}}{k}\right)^2} \approx k\left[1 - \frac{1}{2}\left(\frac{k_{0,1}}{k}\right)^2\right] \quad (2\text{-}16)$$

and ignore the fact that the approximation breaks down when $k \sim 0$ since the near field solution we seek, like the geometrical factor solution, is obtained when $k \to \infty$.

Applying equation (2-16) to equation (2-12) gives, $$C_{zz}^h = \frac{1}{4\pi} \int_0^\infty dk J_0(k\rho)\left\{\left[k^2 + k_0^2 k\frac{(z-z_0)}{2} + \quad (2\text{-}17)\right.\right.$$
$$\left.\left.\frac{k_0^2}{2}\right]e^{-k(z-z_0)} + \frac{(k_1^2 - k_0^2)}{4}e^{k(z+z_0-2z_1)}\right\}$$

The above expression can be integrated exactly to give $$C_{zz}^h = \frac{1}{4\pi}\left\{\frac{1}{r^3}\left[\frac{3(z-z_0)^2}{r^2} - 1\right] + \quad (2\text{-}18)\right.$$
$$\left.\frac{k_0^2}{2r}\left[1 + \left(\frac{z-z_0}{r}\right)^2\right] + \frac{(k_1^2 - k_0^2)}{4r^1}\right\}$$

where $r = \sqrt{\rho^2 + (z-z_0)^2}$ and $r^1 = \sqrt{\rho^2 + (z+z_0-2z_1)^2}$.

The first term in equation (2-18) represents the mutual inductance term and, as such, is independent of the coupling with the formation. It therefore does not need to be discussed further.

The remaining coupling coefficients without skin effect are obtained in a similar manner and are elaborated as follows:

$$C_{zx}^h = \quad (2\text{-}19)$$
$$\frac{(k_1^2 - k_0^2)}{16\pi r^1}\frac{\rho}{[r^1 - (z+z_0-2z_1)]} - \frac{k_0^2 \rho(z-z_0)}{r^3}$$

$$C_{xz}^h = \quad (2\text{-}20)$$

-continued $$\frac{(k_0^2 - k_1^2)}{16\pi r'} \frac{\rho}{[r' - (z + z_0 - 2z_1)]} - \frac{k_0^2 \rho (z - z_0)}{r^3}$$

$$C_{xx}^h = \frac{(k_1^2 - k_0^2)}{16\pi r'} + \frac{k_0^2}{4\pi r}\left[1 - \frac{1}{2}\left(\frac{z - z_0}{r}\right)^2\right] - \qquad (2\text{-}21)$$

$$\frac{1}{4\pi[r' - (z + z_0 - 2z_1)]}\left[\frac{(k_1^2 - k_0^2)}{4} + k_0^2 \gamma_{10}\right]$$

where $$\gamma_{10} = \frac{\sigma_0 - \sigma_1}{\sigma_0 + \sigma_1}$$

It suffices to say that similar results can and have been obtained for the receiver in Medium 1, so for brevity's sake the results will not be stated.

At this point it will be helpful to state some results which will be useful later. Clearly, the magnetic coupling due to dip can not only be sensed in a conventional horizontal (H.M.D.) dipole receiver but also in a vertical (V.M.D.) receiver coil. Indeed, there is dip and strike information within this additional coupling. It can be shown in a straightforward manner that the magnetic fields induced in a pair of horizontal coils are:

$$H_{x'} = \frac{M}{2}\cos\beta[(C_{zz}^h - C_{xx}^h)\sin 2\alpha + \qquad (3\text{-}28)$$

$$(C_{xz}^h - C_{zx}^h) + (C_{xz}^h + C_{zx}^h)\cos 2\alpha]$$

$$H_{y'} = \frac{M}{2}\sin\beta[(C_{zz}^h - C_{xx}^h)\sin 2\alpha + \qquad (3\text{-}29)$$

$$(C_{xz}^h - C_{zx}^h) + (C_{xz}^h + C_{zx}^h)\cos 2\alpha]$$

It is obvious from an inspection of equations (3-28) and (3-29) that the strike angle B can be obtained immediately as, $$\beta = \tan^{-1}\left(\frac{H_{y'}}{H_{x'}}\right) \qquad (3\text{-}30)$$

The dip information contained within (2-10), (3-28), and (3-29) is not as easily retrieved. However, an inverse type solution, although more time consuming, is always possible. See, for example, Gianzero S., Lin Y-Y, Strickland R., "Inversion of Induction Logging Data Using the Least Squares Technique", Paper AA, SPWLA Twenty-Fifth Annual Logging Symposium, June 10-13, 1984; Gianzero S., Lin Y., Su S., "A New High-Speed Hybrid Technique for Simulation and Inversion of Resistivity Logs", SPE 14189, Sept. 22-25, 1985; and Minerbo G., "Inversion of Induction Logs in Dipping Beds", Progress in Electromagnetics Research Symposium, Session XIX, July 25-26, 1989. These publications describe inverse type solutions applied to standard induction and resistivity tools.

In like manner, the dip information can also be retrieved in the present invention by means of an inverse type mathematical solution. Adapting the procedures described in the above references to the present invention is quite straightforward and will therefore only briefly be described. First a guess is made of what the parameters are in the physical situation—in this case the dip information (the strike already being known), and the conductivity. Then, using a forward model which essentially computes the response of the tool, a simulated log is computed and compared with the actual log. This is all done automatically in the computer program. Then, depending upon the degree of departure of the computed log from that of the actual log, the guess is automatically perturbed in a manner to make the simulated log converge to the actual. The final "guess" which gives the desired fit is the dip of the formation.

Figure 5:
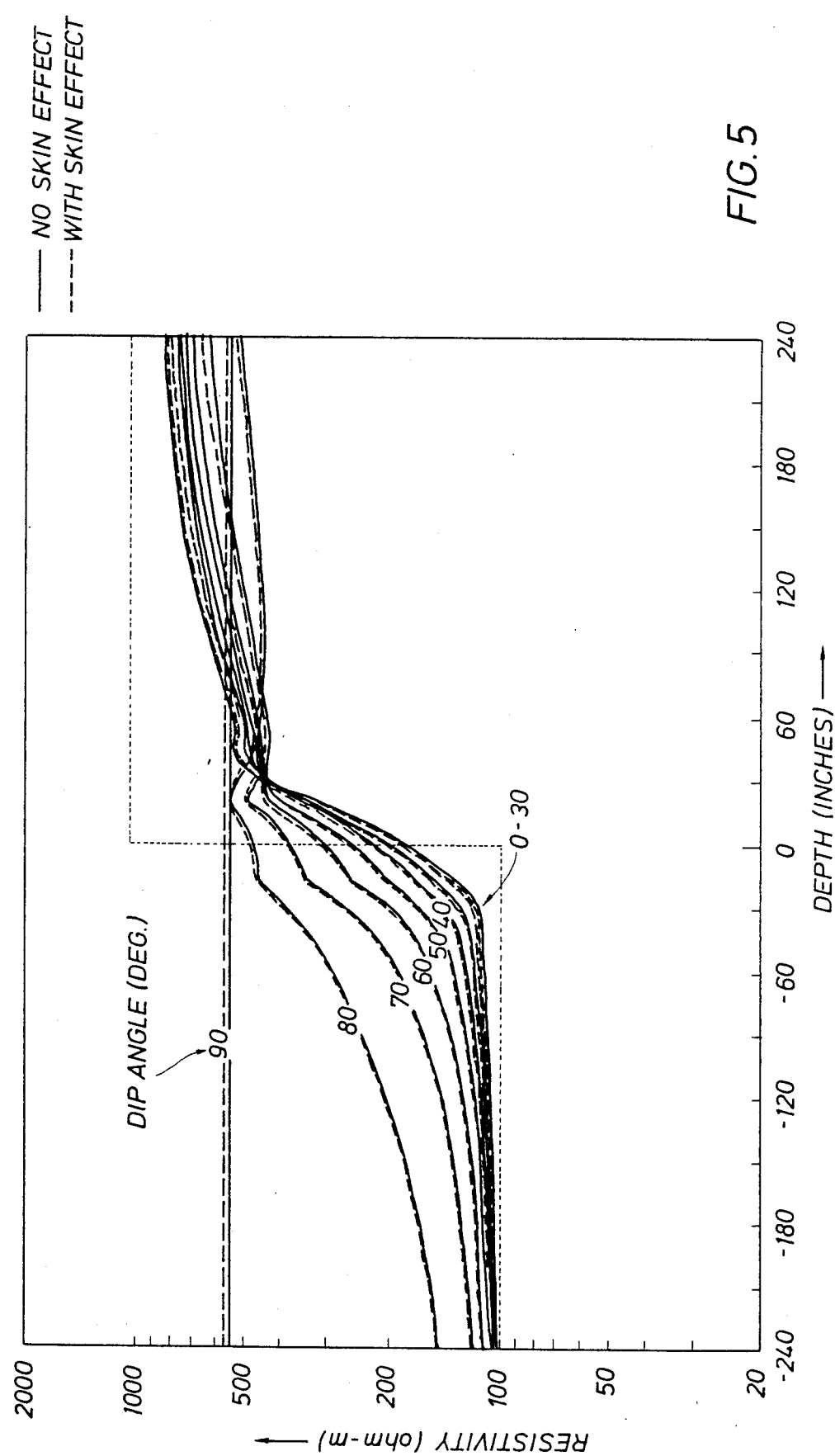
FIG. 5 is a graphical comparison with the exact theory, for a standard tool in two different beds, of the "no-skin-effect" theory of the present invention.

Having thus developed the "no-skin-effect" theory, it is useful to apply it to a standard induction logging tool (such as the "ILd" tool) in a highly resistive formation and compare the results with those of the exact theory. FIG. 5 illustrates this comparison for two beds of 100-$\Omega$-m and 1000-$\Omega$-m respectively for the dip angle $\alpha$ ranging from no dip to 90° dip. The agreement between the two results is excellent. It should be noted that no boosting procedure has been applied to the computed results.

Figure 6:
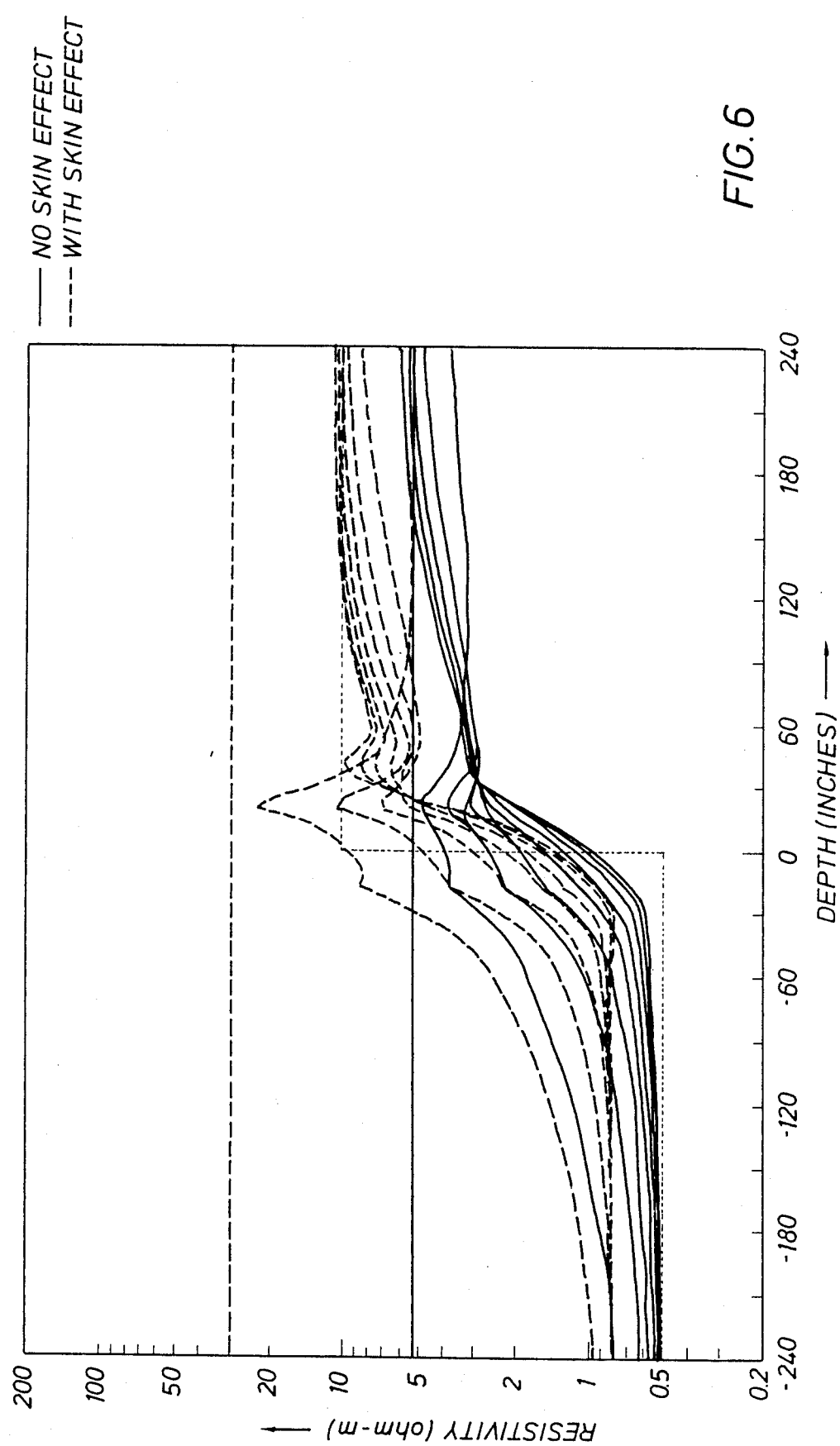
FIG. 6 is a comparison similar to that of FIG. 5 for a worst case situation.
Figure 7:
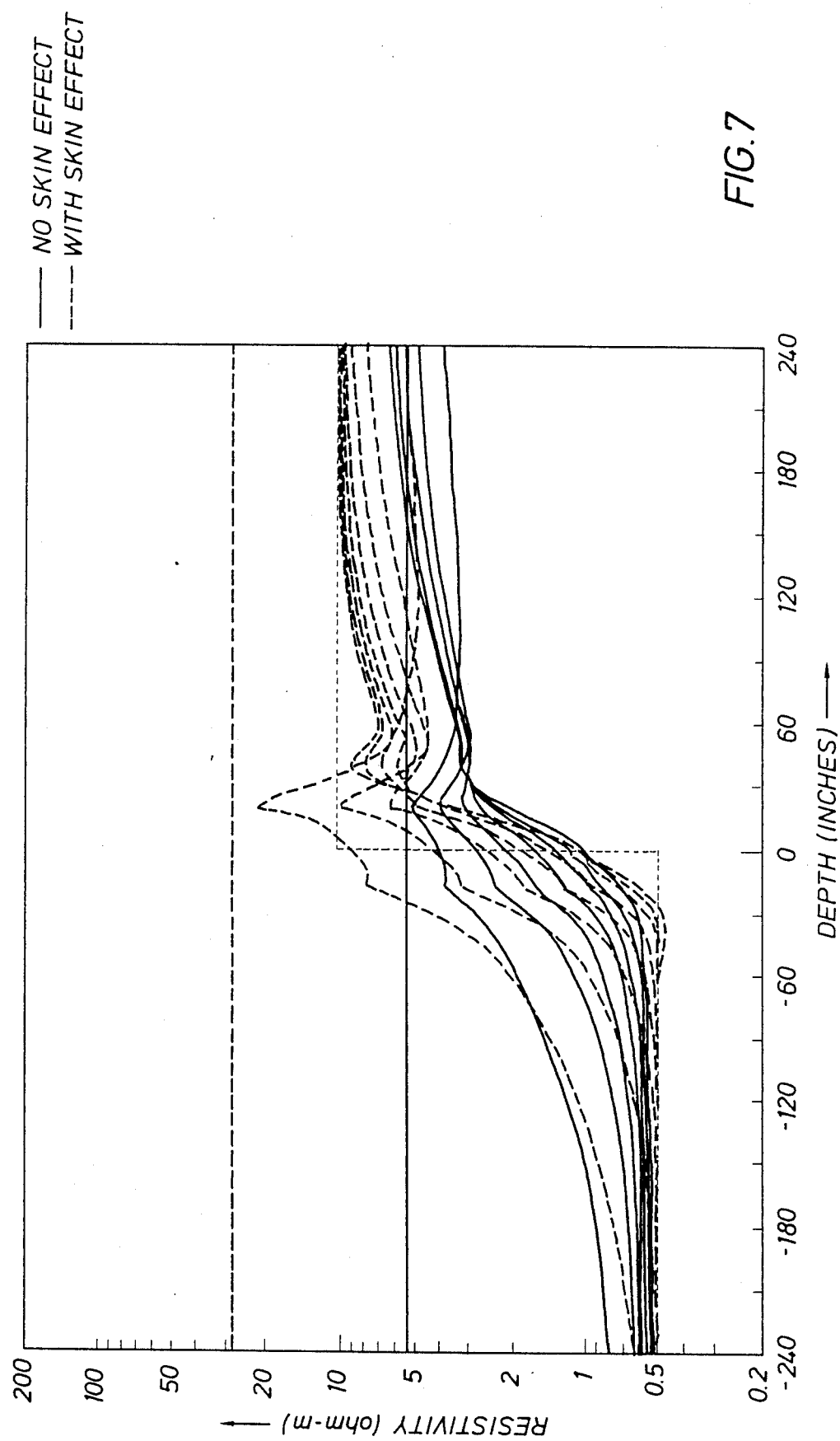
FIG. 7 is a comparison similar to that of FIG. 6 after the results have been boosted.

FIG. 6 shows a worst case situation wherein there is a huge amount of skin effect and therefore a discrepancy between the exact and the approximate results. In either case, the overall response to dip is largely predicted by the simple theory. Indeed, if the computed exact results are boosted, then the solutions are brought into closer agreement in the conductive zone, as borne out in FIG. 7. In the resistive zone, the boosting has little effect.

Figure 8:
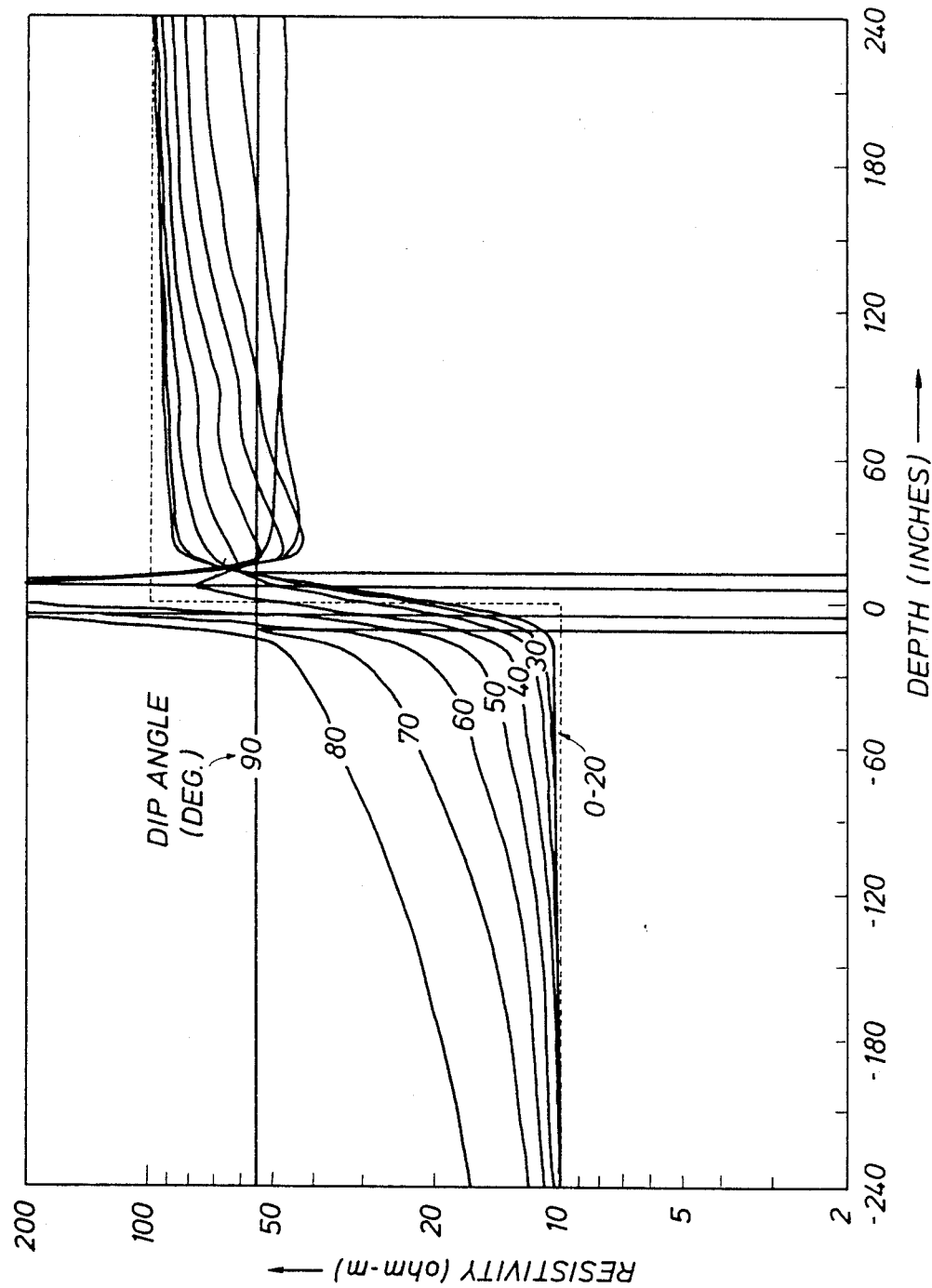
FIG. 8 is a comparison similar to that of FIG. 7 for another standard induction tool.

FIG. 8 illustrates the same comparison as in FIG. 5 for a high resolution tool (such as the "HRd" tool) without deconvolution. Notice the presence of the horns 60 precisely at the bed boundary. With the present invention it is possible to remove the horns without any degradation in resolution. One possibility might be to modify the tool to have the same complement (same turns ratio) of vertical receiver coils as horizontal receiver coils, perhaps then making it possible to correct the conventional signal with the additional signal. However, it must first be recognized that the conversion of voltages to apparent conductivity does not employ the same constant since the coupling is different. Unfortunately, in a symmetrical formation there is no coupling between a horizontal transmitter coil and a vertical receiver coil, which is the reason this coupling has been referred to as skew coupling. However, the coupling between vertical transmitter and receiver coils is precisely half the corresponding coupling between horizontal pairs. This suggests doubling the standard conversion factor when applied to the vertical receiver coil. Unfortunately, the character of the horns on the skew signal log were sufficiently disparit from those on the standard log to allow a simple superposition for correction. However, the horns on the skew log are precisely at the same location as the horns on the conventional log. Consequently they were used as an "indicator", in depth, to direct the gating and clipping procedure used in the correction process.

Figure 9:
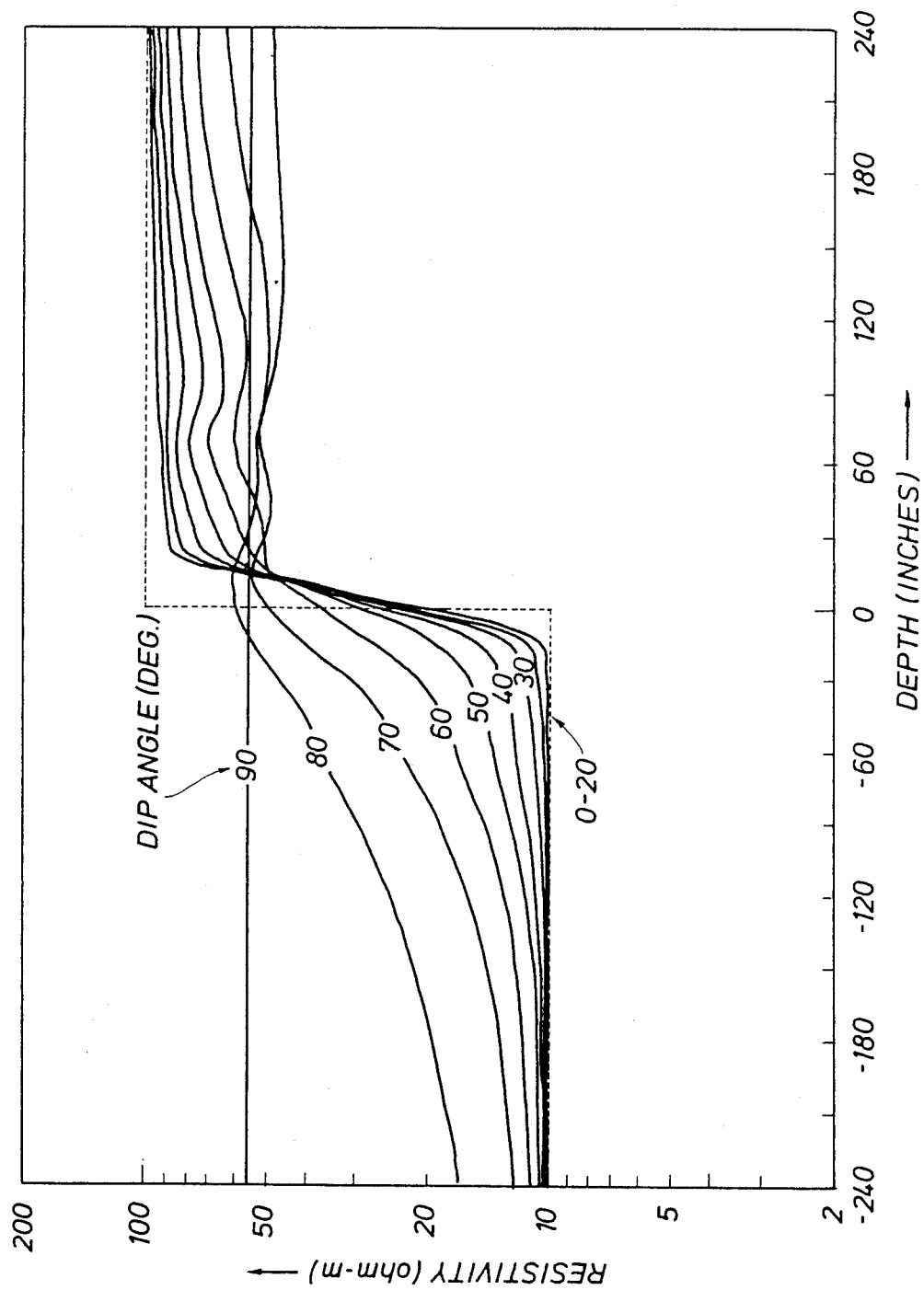
FIG. 9 is a comparison similar to that of FIG. 8 wherein both sets of receiver coils are employed and the total signal is the appropriate combination thereof.
Figure 10:
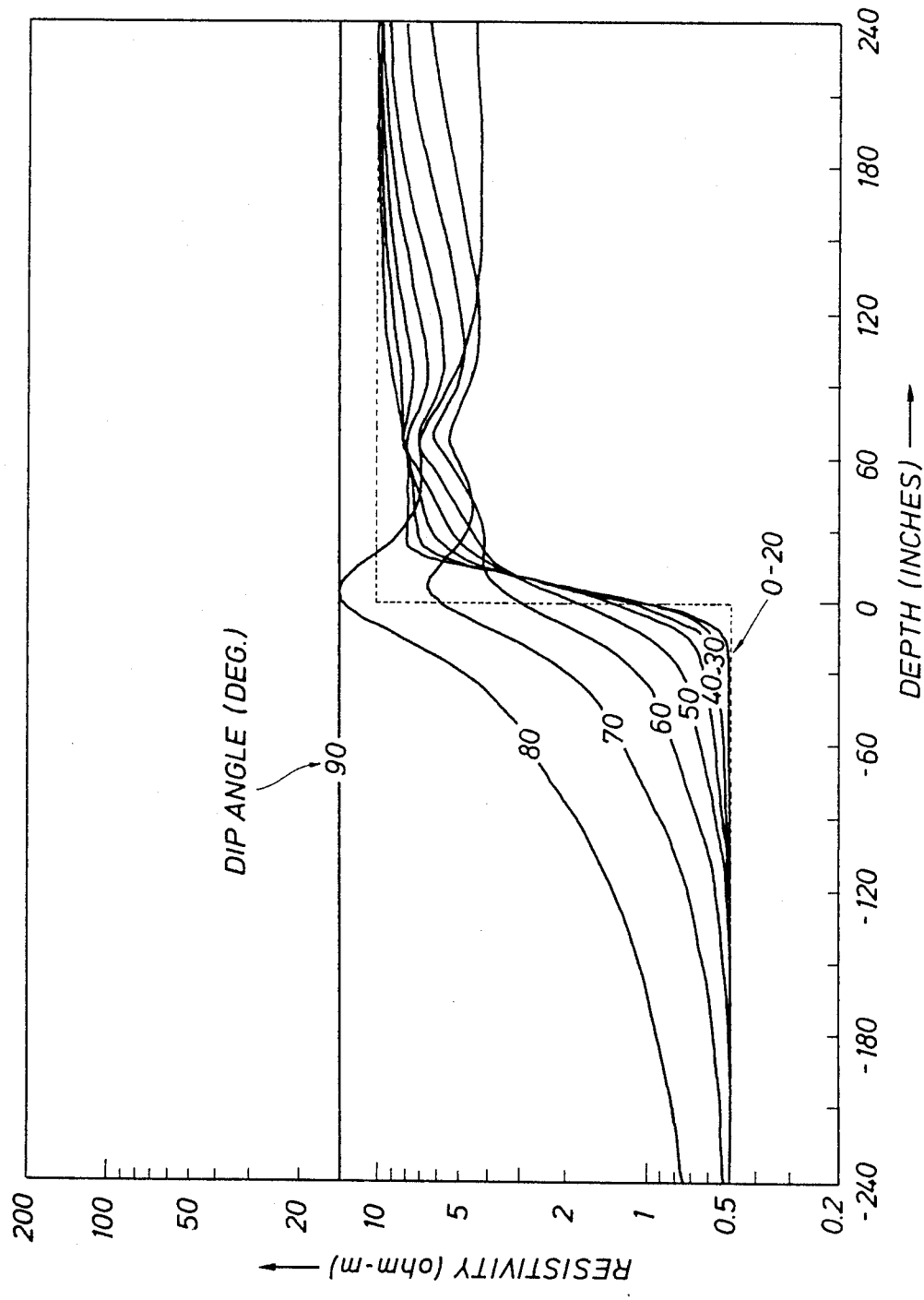
FIG. 10 is a comparison similar to that of FIG. 9, but for a case with severe skin effect.

FIG. 9 shows the results obtained after applying this correction process to the conventional signal. It is apparent that, in this case, the horn has been removed without any loss in vertical resolution. Moreover, the same correction applied to the case with severe skin effect as in FIG. 10 works equally well.

Finally, we address the problem of skew coupling from an eccentered tool. Skew coupling arises whenever there is a departure from radial symmetry as well as from dipping formations. The most common problem is the effect of a logging tool which is eccentered in the borehole. The effect gives rise to a noise signal from the standpoint of measuring skewness from dipping beds. The mathematics have already been worked out (Gianzero, ibid), so the results can simply be stated.

If a tool is eccentered in a borehole of radius a, of conductivity $\sigma_0$, and surrounded by a homogeneous conductivity $\sigma_1$, the induced electric fields without skin effect are:

$$E_{x0}(\rho,0,L) = 0 \quad (6\text{-}1)$$

$$E_{y0}(\rho,0,L) = \frac{Mk_0^2}{\sigma_0\pi^2 a^2} \int_0^\infty dx \cos\left(x\frac{L}{a}\right) \sum_{m=1}^\infty m^2 \Gamma_m(x) I_m^2\left(x\frac{\rho}{a}\right) \quad (6\text{-}2)$$

where $$\Gamma_m(x) = \frac{\left(1 - \frac{\sigma_1}{\sigma_0}\right) K_m^2(x)}{\left[1 + \left(1 - \frac{\sigma_1}{\sigma_0}\right) x I_m(x) K_m'(x)\right]} \quad (6\text{-}3)$$

The corresponding magnetic coupling in a vertical receiver coil in units of apparent conductivity is given by the following formula:

$$\sigma_a = \frac{\sigma_0}{\pi}\left(\frac{L}{a}\right) \int_0^\infty dx \sin\left(x\frac{L}{a}\right) \sum_{m=0}^\infty \epsilon_m I_m\left(\frac{x\rho_0}{a}\right) \quad (6\text{-}4)$$

$$\left\{ 2m^2 \Gamma_m(x) \left[\left(1 - \frac{\sigma_1}{\sigma_0}\right) K_m(x) I_m(x) I_m'\left(\frac{x\rho}{a}\right) - \frac{I_m\left(\frac{x\rho}{a}\right)}{\frac{x\rho}{a}}\right] \right.$$

$$\left(1 - \frac{\sigma_1}{\sigma_0}\right) I_m'\left(\frac{x\rho}{a}\right)$$

$$\left. \left(2xK_m(x)K_m'(x) + x^2\left[K_m'^2(x) - \left(1 + \frac{m^2}{x^2}\right)K_m^2(x)\right]\right)\right\}$$

Figure 11:
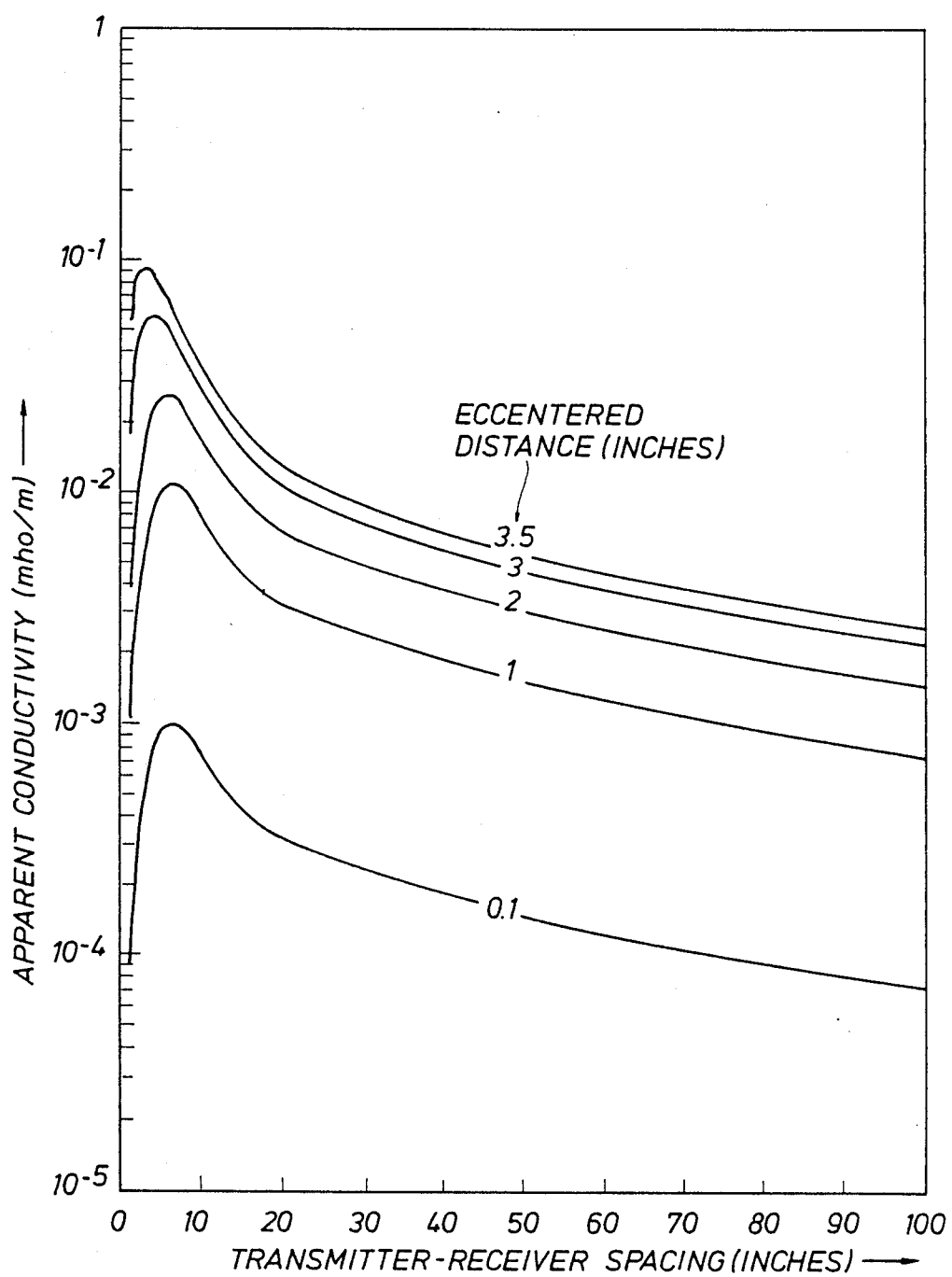
FIG. 11 depicts the skew coupling signal for typical two coil pairs that are eccentered in the wellbore.
Figure 12:
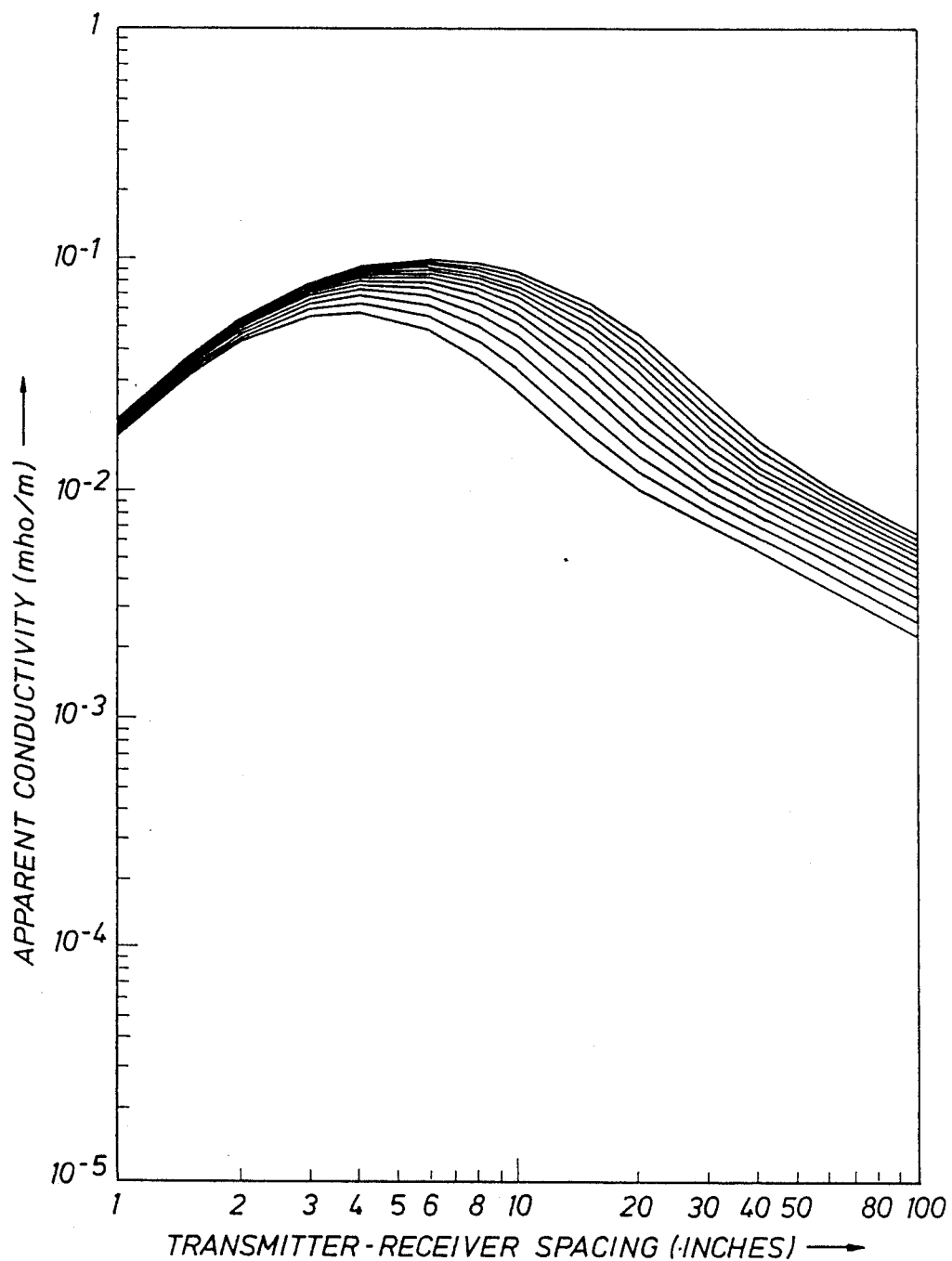
FIG. 12 and 13 display results similar to FIG. 11 for the magnetic coupling for two fixed stand-off values and a variety of borehole sizes.
Figure 13:
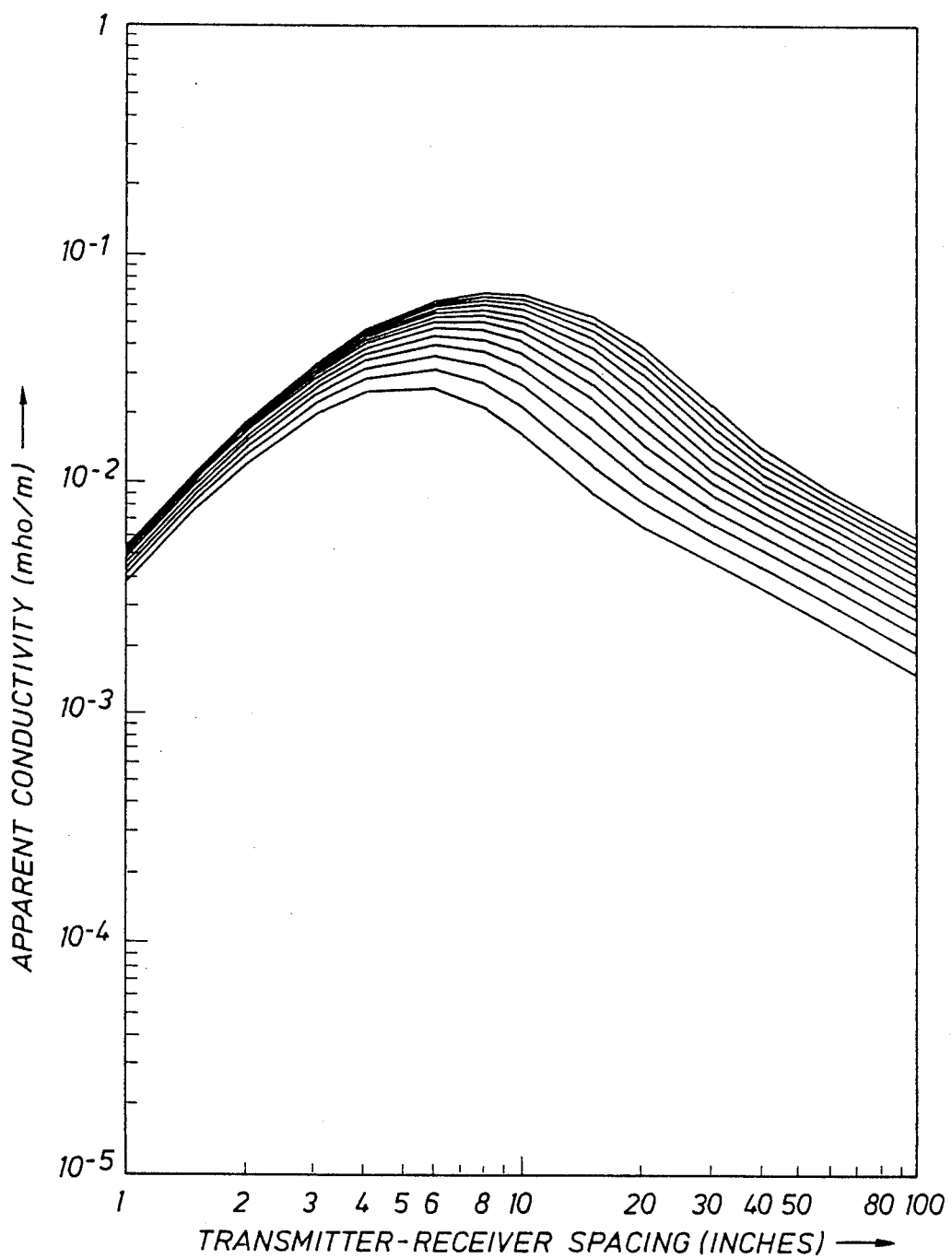
Figure 14:
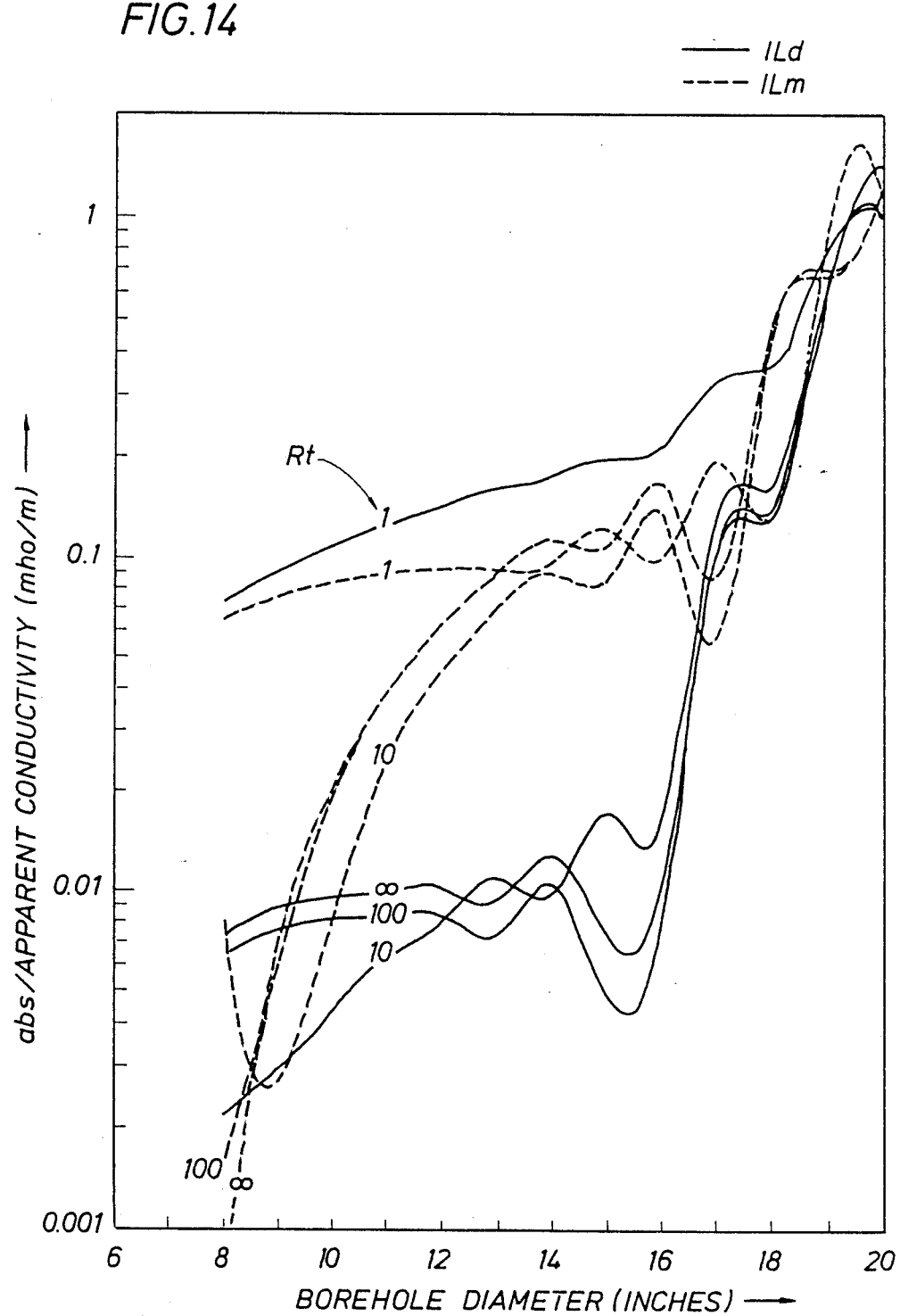
FIG. 14 demonstrates the skew signal for stand-off for two standard induction logging sondes.
Figure 15:
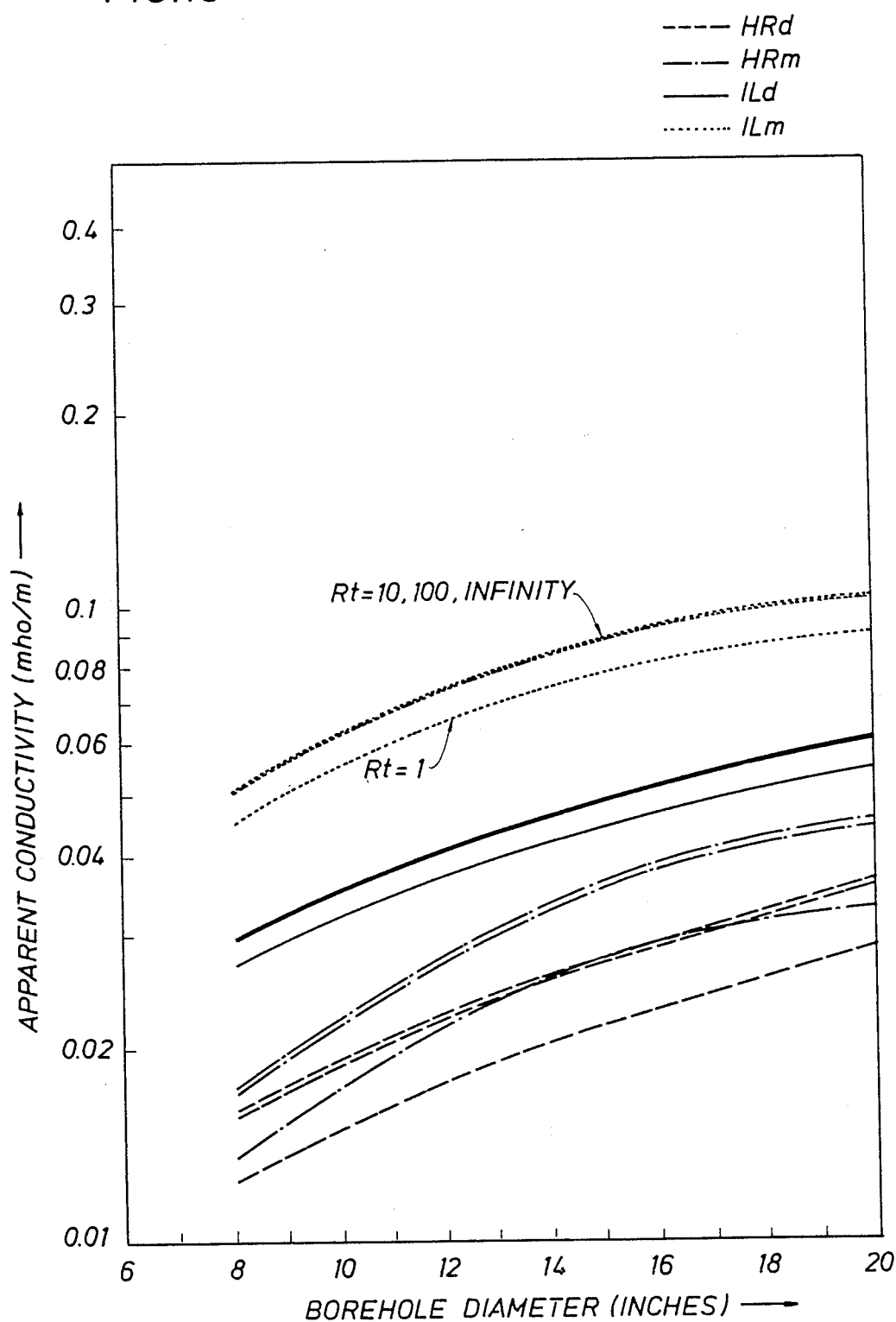
FIG. 15 illustrates in a comparison of the tilt signals between the FIG. 14 sondes and a high resolution induction sonde in the presence of tilt.

It will therefore be observed that the magnetic skew coupling caused by an eccentered borehole position vanishes for a symmetrical induction sonde having transmitter coils on each side of the receiver coils. FIG. 11 depicts the skew coupling signal for typical two coil pairs. FIGS. 12 and 13 display similar results for the magnetic coupling for two fixed stand-off values (1" and 2", respectively) and a variety of borehole sizes. FIG. 14 demonstrates the skew signal for stand-off for two standard induction logging sondes (the "ILm" and "Ild"). FIG. 15 illustrates a comparison of the tilt signals between these standard induction sondes and a high resolution induction sonde (the "HRI"), wherein it will be seen that the latter has a much reduced effect. Considering that a logging sonde will typically have a length of 20 feet or more, it will be therefore be recognized that problems due to tilt will be minimal.

As may be seen, therefore, the present invention has numerous advantages. Principally, it removes horns and horn-like log distortions from induction logs while causing no loss of resolution. Further, the correction is very easily implemented by gating an appropriate correction function on and off in response to the skew signal. The skew signal which is detected and measured by the present invention provides a direct measure of the degree of formation asymmetry. It is also directly related to formation dip and strike, such that these can now be determined by induction logging techniques. Thus it is now readily feasible with an induction log measurement to look for problems caused by dip or other asymmetries, identify them, and back them out.

Of course, various modifications to the present invention will occur to those skilled in the art upon reading the present disclosure. For example, the additional coils do not necessarily have to be horizontal. Ideally they will be orthogonal to the conventional receiver coils (which are usually vertically oriented), but in fact the invention, with straightforward adjustments in the signal processing, will work as long as the second receiver coil system has an orientation which is different from (not co-axial with) that of the primary receiver coil system. Therefore, while the methods and forms of apparatus herein described constitute preferred embodiments of this invention, it is to be understood that the invention is not limited to these precise methods and forms of apparatus, and that changes may be made therein without departing from the scope of the invention.

What is claimed is:

1. In apparatus for induction logging, including transmitter coil means and first receiver coil means adapted for movement through a borehole, and means for energizing the transmitter coil means to induce in the receiver coil means a signal characteristic of the conductivity of formations adjacent such a borehole, the improvement comprising:
   second receiver coil means having an orientation different from said first receiver coil means,
   means connected to at least said second receiver coil means for determining a skew signal induced in at least said second receiver coil means by skewness in the field pattern of the logging apparatus when in the presence of an asymmetrical formation structure, and
   means coupled to both said receiver coil means for generating a log of such formations, including means responsive to said skew signal to compensate, with substantially no loss in vertical resolution, for log errors due to skewness in the field pattern.

2. The improvement of claim 1 wherein said first and second receiver coil means are substantially orthogonal to one another.

3. The improvement of claim 2 wherein said first receiver coil means is oriented substantially vertically and said second substantially horizontally.

4. The improvement of claim 1 wherein said means for generating a log of the formations further comprises:
   means for generating a log of the conductivity of the formations, and
   means for using said skew signal to correct for horns produced in said log when the induction logging apparatus traverses an interface between dipping beds.

5. The improvement of claim 4 wherein said means for correcting for horns in said log further comprises means for limiting said conductivity characteristic receiver coil signals to correct for such horns.

6. The improvement of claim 5 wherein said means for limiting further comprises means for limiting said signals in response to said skew signal.

7. The improvement of claim 1 further comprising means for using said skew signal to determine the strike of dipping beds.

8. The improvement of claim 1 further comprising means for using said skew signal to determine the dip of dipping beds.

9. The improvement of claim 1 further comprising means for using said skew signal to generate a composite measure of the asymmetry of the formation structure.

10. The improvement of claim 1 wherein said first and second receiver coil means are symmetrical.

11. The improvement of claim 10 further comprising transmitter coil means symmetrically located on each side of said first and second receiver coil means.

12. In apparatus for induction logging, including symmetrical transmitter coil means and symmetrical first receiver coil means adapted for movement through a borehole, the first receiver coil means being oriented substantially vertically and the transmitter coils being symmetrically located on each side of the receiver coil means, means for energizing the transmitter coil means to induce in the receiver coil means a signal characteristic of the conductivity of formations adjacent such a borehole, detecting means coupled to the receiver coil means for producing a measure signal representing the conductivity of the formations, and means utilizing said measure signal to generate a log of the conductivity of the formations, the improvement comprising:
symmetrical second receiver coil means oriented substantially horizontally,
means connected to said second receiver coil means for determining a skew signal induced in said second receiver coil means by skewness in the field pattern of the logging apparatus when in the presence of an asymmetrical formation structure,
means for using said skew signal to correct for horns produced in said log, when said induction logging apparatus traverses an interface between dipping beds, by clipping said receiver coil signals in response to said skew signal, and
means for using said skew signal to determine the dip and strike of dipping beds when said induction logging apparatus is in the presence of an interface between such dipping beds.

13. The improvement of claim 12 further comprising means for using said skew signal to generate a composite measure of the asymmetry of the formation structure.

14. A method for induction logging, comprising:
moving transmitter coil means and first receiver coil means of an induction logging apparatus through a borehole,
energizing the transmitter coil means to induce in the receiver coil means a signal characteristic of the conductivity of formations adjacent such a borehole,
determining a skew signal induced in at least a second receiver coil means by skewness in the field pattern of the logging apparatus when in the presence of an asymmetrical formation structure, the second receiver coil means having an orientation different from the first receiver coil means,
generating a log of such formations, and
compensating, in response to the skew signal and with substantially no loss in vertical resolution, for log errors due to skewness in the field pattern.

15. The method of claim 14 wherein the first and second receiver coil means are substantially orthogonal to one another.

16. The method of claim 15 wherein the first receiver coil is oriented substantially vertically and the second substantially horizontally.

17. The method of claim 14 wherein said generating and compensating steps further comprises:
generating, from the signal characteristic of the conductivity of the formations, a log of the conductivity of the formations, and
using the skew signal to correct for horns produced in the log when the induction logging apparatus traverses an interface between dipping beds.

18. The method of claim 17 wherein said step of correcting for horns in the log further comprises limiting the conductivity characteristic receiver coil signals to correct for such horns.

19. The method of claim 18 further comprising limiting the signals in response to said skew signal.

20. The method of claim 14 further comprising using the skew signal to determine the strike of dipping beds.

21. The method of claim 14 further comprising using the skew signal to determine the dip of dipping beds.

22. The method of claim 14 further comprising using the skew signal to generate a composite measure of the asymmetry of the formation structure.

23. The method of claim 14 wherein the first and second receiver the coil means are symmetrical.

24. The method of claim 23 wherein the transmitter coil means include transmitter coils symmetrically located on each side of the first and second receiver coil means.

25. A method for induction logging, comprising:
moving symmetrical transmitter coil means and symmetrical first receiver coil means of an induction logging apparatus through a borehole, the first receiver coil means being oriented substantially vertically and the transmitter coils being symmetrically located on each side of the receiver coil means,
energizing the transmitter coil means to induce in the receiver coil means a signal characteristic of the conductivity of the formations adjacent such a borehole,
producing a measure signal representing the conductivity of the formations,
utilizing the measure signal to generate a log of the conductivity of the formations,
determining a skew signal induced in a symmetrical, substantially horizontally oriented second receiver coil means by skewness in the field pattern of the logging apparatus when in the presence of an asymmetrical formation structure,
using the skew signal to correct for horns produced in the log, when the induction logging apparatus traverses an interface between dipping beds, by clipping the receiver coil signals in response to said skew signal, and
using the skew signal to determine the dip and strike of dipping beds when the induction logging apparatus is in the presence of an interface between such dipping beds.

26. The method of claim 25 further comprising using the skew signal to generate a composite measure of the asymmetry of the formation structure.

* * * * *